United States Patent [19]

Premji

[11] Patent Number: 4,991,160
[45] Date of Patent: Feb. 5, 1991

[54] INTEGRATED OPTICAL DEVICE FOR MAGNETO-OPTICAL RECORDING AND READING HEAD

[75] Inventor: Zahirudeen Premji, Boulder, Colo.

[73] Assignee: Nikon Precision Inc., San Bruno, Calif.

[21] Appl. No.: 483,297

[22] Filed: Feb. 20, 1990

Related U.S. Application Data

[63] Continuation of Ser. No. 200,527, May 31, 1988, abandoned.

[51] Int. Cl.$^5$ .................... G11B 11/14; G11B 7/125
[52] U.S. Cl. .................................. 369/44.12; 369/13;
369/110; 369/112; 360/114; 350/96.1;
350/96.12; 350/96.14; 350/375; 350/376
[58] Field of Search ............... 250/201; 369/13, 44.12,
369/110, 112; 365/122; 360/114; 350/375, 376,
96.11, 96.12, 96.14

[56] References Cited

U.S. PATENT DOCUMENTS

| | | | |
|---|---|---|---|
| 3,876,842 | 4/1975 | Bouwhuis | 369/109 |
| 3,877,784 | 4/1975 | Lin | 350/377 X |
| 3,949,387 | 4/1976 | Chaudhari et al. | 365/122 |
| 4,796,226 | 1/1989 | Valette | 365/122 |
| 4,833,561 | 5/1989 | Sunagawa et al. | 369/45 X |

OTHER PUBLICATIONS

Kogelnik, "Review of Integrated Optics", pp. 227–239.
R. C. Alferness et al, "Ti:LiNbO$_3$ Guided-Wave Devices for Long Wave-Length Telecommunications", pp. TuAl-1–TuAl-4.
D. Yap et al, "Radiation-Field Coupling in Optical Waveguide Structures with Closely Spaced Abrupt Bends and Branches", *Integrated Optical Circuit Engineering* (1984), vol. 517, pp. 137–141.
Y. Bourbin et al, "Multi Section Switching Characteristics and Broadband Modulation in Y-Fed Directional Couplers", *Advanced Optoelectric Technology* (1987), vol. 864, pp. 116–124.
G. M. McWright, "Directional Coupler Modulators for High Speed Diagnostics", *Photonics: High Bandwidth Analog Applications* (1986), vol. 648, pp. 288–300.
M. Papuchon et al, "Interferometric Sensors Using Integrated Optics", *Photonics: High Bandwidth Analog Applications* (1986), vol. 648, pp. 259–287.
Papuchon M., "Integrated Optical Modulation and Switching", *Integrated Optical Engineering* (1984), vol. 517, pp. 154–162.
D. Eberhard et al, "Single Mode Channel Waveguide Polarizer on LiNbO$_3$", pp. 202–205 and 166–167.
M. Papuchon et al, "Anisotropic Polarizers for Ti:LiNbO$_3$ Strip Waveguides", pp. WC5-1–WC5-4.
Gabriel Lengyel, "GaAlAs p-i-n Junction Waveguide Modulators", pp. 133–139.
C. Mariller et al, "A Simple and Wide Optical Bandwidth TE/TM Converter Using Z Propagating LiNbO$_3$ Waveguides", pp. 174–176.
V. Hinkov, "Low Frequency Collinear Acoustooptic TM$_o$–TE$_o$ Mode Conversion and Single Sideband Modulation in Proton-Exchanged LiNbO$_3$ Optical Waveguides", pp. 168–169.
D. Marcuse, "Leaky Waves", *Theory of Dielectric Optical Waveguides*, (1974), pp. 31–43.
Paul R. Ashley, "Design Considerations for Mode Extinction Modulators in LiNbO$_3$ Waveguides", *Integrated Optical Circuit Engineering*, vol. 578, pp. 75–80.

*Primary Examiner*—Robert L. Richardson
*Attorney, Agent, or Firm*—Shapiro and Shapiro

[57] ABSTRACT

An integrated optical device for magneto-optical recording and/or reading employs elements that may be fabricated on a substrate using semiconductor manufacturing technology. Such elements include, but are not limited to, a system of waveguides for transmitting light energy beams from lasers to end portions of the waveguides exposed to the outside of the substrate, and from those end portions to detectors, so that reading, writing, focusing, and tracking operations may be performed. The waveguide systems include, e.g., polarization controllers and mode splitters.

34 Claims, 4 Drawing Sheets

INTEGRATED OPTICAL DEVICE FOR MAGNETO-OPTICAL RECORDING AND READING HEAD

This is a continuation of application Ser. No. 200,527 filed May 31, 1988, now abandoned.

BACKGROUND OF THE INVENTION

1. Field of the Invention

This invention relates to an integrated optical device for a magneto-optical recording/reading head.

2. Description of the Prior Art

In recent years, many efforts have been made to develop an optical recording/reading method, an optical recording apparatus and a medium used therefor, which can satisfy various requirements including high density, large capacity, high speed access and high recording/reading speed. Of various optical recording/reading methods, the magneto-optical recording/reading method is most attractive due to its unique advantages that information can be erased after use and new information can be written thereon. Such a magneto-optical recording/reading method is described in the U.S. Pat. No. 3,949,387. A tracking system of a magneto-optical disk is described in the U.S. Pat. No. 3,876,842. In the art, "to record" is "to write" or "to store", and "to read" is "to reproduce" or "to retrieve".

In recording of information on magneto-optical disks, a major cost item is the optical head. Currently discrete components are used to achieve the optical elements required to generate, detect and guide the light to and from the various parts of the storage device and media. To make optical storage competitive financially with magnetic recording technology, a significant cost reduction is required in the optical system used.

SUMMARY OF THE INVENTION

It is an object of the present invention to provide an optical head or optical system for magneto-optical recording/reading that leads to cost reduction.

A way to achieve this cost reduction is to use integrated optical elements in the construction of such an optical system. Since the elements are fabricated using semiconductor manufacturing technology, the fabrication prices can take advantage of established means of fabrication. Using such a technique, a reduction in size of all elements is possible, allowing compactness in the optical system. Also, once the device is designed and a manufacturing process is established, large quantities of the device can be made for small incremental cost. An optical system is presented here for information storage and retrieval on a medium that is capable of read/write and erase using magneto-optical materials. Such a material rotates the polarization angle of an incident beam of polarized light by a certain fixed amount (dependent on the material used) based on the magnetic state of the material. This state can be changed by application of heat and an external magnetic field.

The general nature of the invention having been set forth, the following examples are presented as specific illustrations thereof. It will be understood that the invention is not limited to these specific examples but is susceptible to various modifications that will be recognized by one of ordinary skill in the art.

DESCRIPTION OF THE PREFERRED EMBODIMENTS

In magneto-optic recording of information on a moving medium having magneto-optic materials previously deposited on it, a basic system requires elements to emit intense light, to polarize this emitted light preferentially, to guide the polarized light to and from the magneto-optic surface while placing the emitted and returned beam or beams of light in the desired locations and a method of analyzing the returned light for information content.

Figure 1:
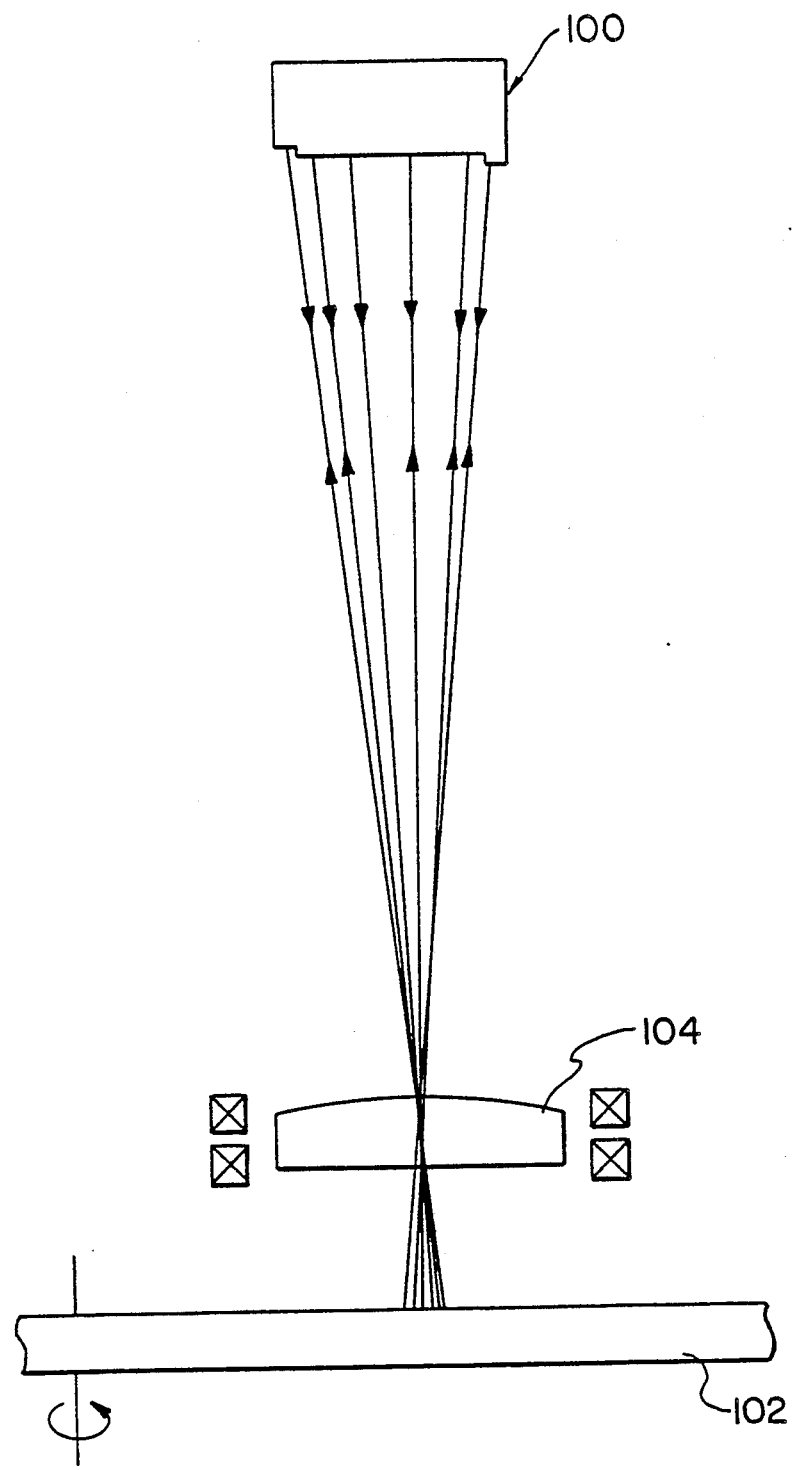
FIG. 1 is a schematic view illustrating an embodiment of this invention.

FIG. 1 schematically shows the entire construction of a magneto-optical recording and reading apparatus using the basic system of this invention. An integrated optical head 100 is provided to emit light toward a moving medium 102 (e.g., on a disk) via an optical system 104 and to receive light reflected from the medium 102 via the optical system 104.

Figure 2:
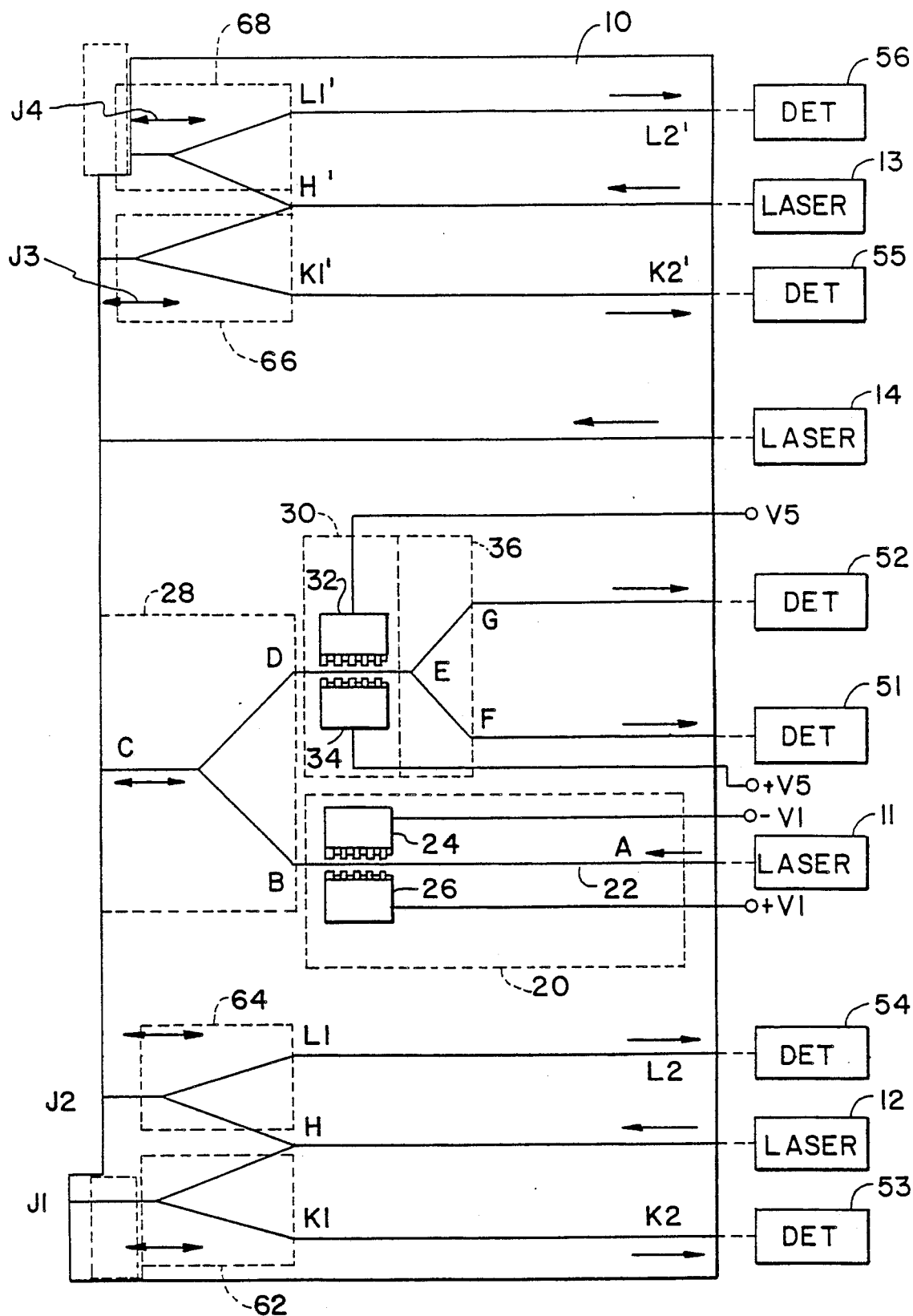
FIG. 2 is a plan view showing the integrated optical head shown in FIG. 1.

An implementation of such an optical device is presented in the FIG. 2. This optical device relies on the majority of the functions being fabricated on one or more substrates of integrated optical circuits. The figure shows the implementation of all functions except laser and detector devices on one integrated circuit. However, it would be possible to separate the various or several circuits if advantages were present in doing so. For instance, it may be desirable to have all the lasers on one circuit and the other components on another circuit, permitting fabrication of devices of similar technologies on one chip.

Referring to FIG. 2, four laser sources 11, 12, 13 and 14 are shown disposed on a surface adjacent to that of a substrate 10. Light from laser source 11 is used for reading information from the medium. Light from laser sources 12 and 13 is used for tracking and focusing of tracks (e.g., grooves) of the medium. Light from laser source 14 is used to write information onto the disk.

It is not necessary for all four lasers to be of the same emitted wavelength. In fact, it may be advantageous for laser sources 12 and 13 to be of one wavelength and laser sources 11 and 14 to be of a different wavelength.

Considering first the light from laser source 11, it is directed to an area 20 through a waveguide 22 formed on the substrate 10 by a known method. The area 20 consists of a waveguide polarizer or a first polarizing controller having two electrodes 24 and 26 attached to a periodic structure. Electrodes 24 and 26 are driven by voltages $-V1$ and $+V1$. The periodicity of the periodic structure is proportional to the wavelength of the laser light from the laser source 11. The two electrodes are connected to opposite voltage polarities, the magnitude of which is determined by the length of the electrodes in the direction of the propagation of the laser light and the degree of polarization desired.

Several previous references have used this method of polarization. An alternate method of polarization uses waveguides that are considered "leaky" to one direction of polarization in a sense that of the two orthogonal polarization components, one is made to diffuse into the area around the waveguides while the other polarization component is confined and propagates with a much lower relative loss to the end of the waveguide. Either of these two or other polarizing methods can be used here.

At point A, the light from the laser source 11 could be randomly polarized, and at point B, the light is polarized to a high degree along one direction of polarization.

Figure 3:
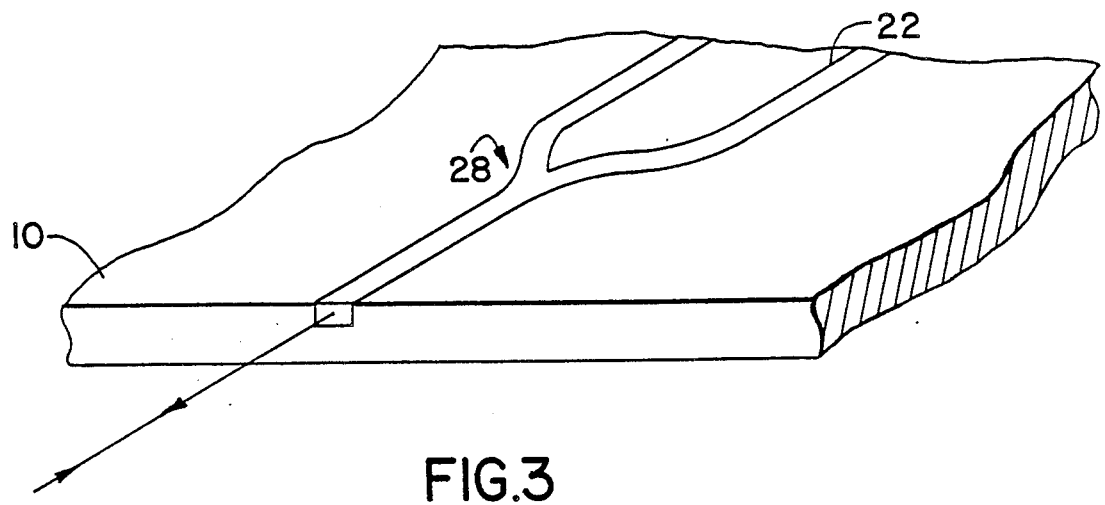
FIG. 3 is a enlarged perspective view of a waveguide section in FIG. 1.

Light at point B is sent along waveguide sections to the point C where it is emitted from the substrate 10. Waveguide section B-C-D has a branching waveguide 28 (see FIG. 3) and is designed to be polarization preserving in that light originating at B is propagated to point C with the same polarization vector and light arriving at point C from a source external to the substrate 10 is propagated to point D maintaining a polarization vector identical to that arriving at point C. Light is returned to point C by reflection from the magneto-optic material. On arriving at C, the light is guided to point D.

Different magneto-optic materials rotate the polarization vector of the incident light by different amounts. Irrespective of the amount of polarization rotation, the proposed method can be used to detect the presence of polarization rotation.

An area 30 consists of a waveguide polarization rotator or a second polarizing controller having two electrodes 32 and 34 attached to a periodic structure. Electrodes 32 and 34 are driven by voltages $-V5$ and $+V5$. Light arriving at the area 30, passes through the waveguide polarization rotator. The operation of this polarization rotator is similar to that given for the polarizer of area 20 mentioned above. However, the purpose of this particular polarization rotator is to rotate the incoming light polarization by a fixed amount.

Unless symmetrical differential detection is applied, the rotation angle may be another value, but not 45 degrees. To simplify the explanation, all other detection methods except symmetrical differential detection will not be discussed here.

The length of the electrodes 32 and 34 and the voltages $-V5$ and $+V5$ are set accordingly to obtain this polarization amount. For the two information states present on the magnetic media, designated "1" and "0" states, which are the result of the magnetic orientation of the magneto-optical material, light arriving at point E has a polarization vector of 44 degrees (light negatively rotated by media, "0" state) or 46 degrees (light positively rotated by media, "1" state). To simplify the explanation, the rotation angle of polarization vector by media is assumed to be 1 degree here.

Figure 4:
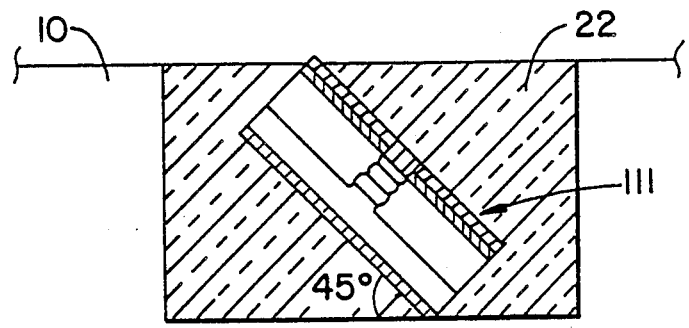
FIG. 4 is a cross-sectional view showing an example of a laser source.

As an alternate method to using polarizing controllers, FIG. 4 illustrates an embodiment where the laser source 111 is attached to the input waveguide 22 at an angle of 45 degrees. Such a construction eliminates the need for the first polarizing controller 20 shown in FIG. 2. It is necessary when using such a scheme that the laser source 111 be constructed to yield essentially all output along a particular angle of polarization, a technique that can be achieved since most diode lasers emit polarized light. If the polarization angle of the laser light is other than strictly TE or TM modes, then the laser is attached to the waveguide such that the resultant output is at 45 degrees. Note that when using this method, the second polarizing controller 30 shown in FIG. 2 could be entirely eliminated.

Whichever method is used from the above two, the light arriving at point E needs to have its polarization vector oriented at either 44 or 46 degrees, dependent on the state of the magnetic domain being read on the magneto-optic media.

Next, the actual methods of detecting the state of information present on the magneto-optical media are presented. For this method, the sections of waveguides E-F and E-G are polarization selecting waveguides 36. This kind of waveguide can be obtained by making a mode splitter with metal cladding on one of the waveguides. These sections split the light at E into two paths, each of which preferentially guides one of the two orthogonal polarization components of light designated as the TE and TM modes. Light arriving at point F contains only the TE component of light at point E and light arriving at point G contains only the TM component of light at point E. Of course, the TE and TM modes could be reversed in location.

Figure 5:
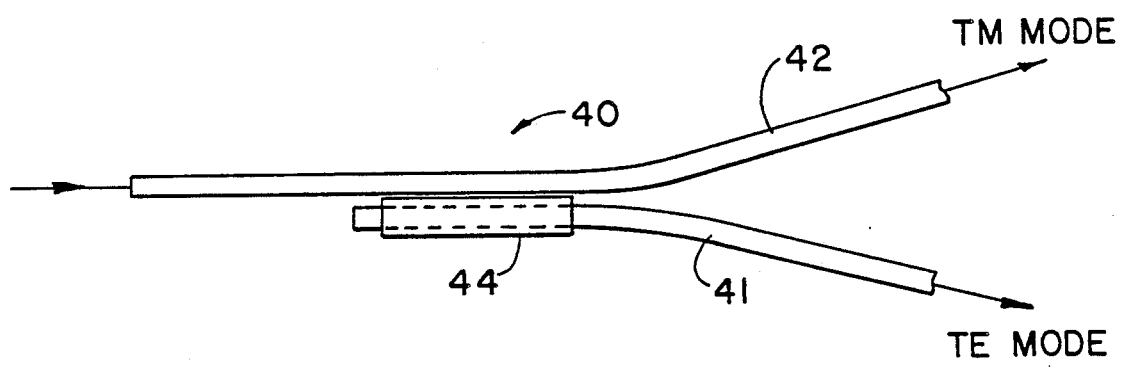
FIG. 5 is a plan view showing a mode splitter shown in FIG. 1.

FIG. 5 shows an example of the mode splitter 40. A waveguide 42 corresponds to part of the section of waveguide D-E-G and has an effective index relative to the guided mode which is equal to that of a waveline guide 41. One end section of the waveguide 41 is disposed in close proximity to the waveguide 42, and the power of light propagated in the waveguide 42 is able to transmit to the waveguide 41 in a ratio of 100%.

Then, when a metal cladding 44 is provided on the end section of the waveguide 41, the effective index of the guided TM mode changes remarkably. Consequently the coupling in the TM mode disappears and only the TE component transmits to the waveguide 41.

The light at points F and G will have substantially the same magnitude if the input light beam is polarized at 45 degrees. This is because the overall polarization vector of light will be equally split among the two polarizing waveguides. For the "0" or "1" state of information, the light arriving at point E will be rotated 44 or 46 degrees, respectively. Light will be split into unequal amplitudes along paths E-F and E-G, resulting in unequal amplitudes at points F and G.

Detectors 51 and 52 are of identical construction and sense the amplitude of light incident upon them. Light is coupled to these detectors by substrate guiding or by radiation. Information content is detected by comparing the relative amplitudes of signals from the detectors 51 and 52. Adjustments by external components connected to these detectors can be made to account for the differences in relative amplitude of the two detectors when sensing light of equal amplitude, a condition that could arise from construction differences.

Detectors 51 and 52 could be electrically biased if necessary to achieve the speed of detection necessary for information discrimination at high speeds.

For tracking and focusing the grooves of a magneto-optic medium on a rotating disk, a method of illumination and detection of reflected light is required. This is accomplished by two identical laser-waveguide-detector combinations 12, 62, 64, 53, 54 and 13, 66, 68, 55, 56.

Light is emitted by a laser source 12 and guided to a splitter at point H. Light branches into two separate waveguides 62 and 64. From here light is emitted at two points J1 and J2 located at the edge of the substrate 10. It is sent to the moving medium 102 to be incident on it. Similarly, light is emitted by a laser source 13 and guided to a splitter at point H'. Light branches into two separate wave guides 66 and 68. From here light is emitted at two points J3 and J4 located at the edge of the substrate 10. It is sent to the moving medium 102 to be incident on it. Light reflected from the medium and received at points J1 and J2 is guided to points K1 and L1 and then to K2 and L2 and detectors 53 and 54, respectively. As shown, points J1 and J2 are spaced along a direction in which light is entered from outside of the substrate, as well as along a perpendicular direction. Light reflected from the medium and received at points J3 and J4 is guided to points K1' and L1' and then to K2' and L2' and detectors 55 and 56, respectively. As shown, points J3 and J4 are spaced along a direction in which light is entered from outside of the substrate, as well as along a perpendicular direction. Detectors 53 and 56 are used for focus detection and detectors 54 and 55 are used for tracking detection. Each detector measures the amplitude of the light detected. The spot size of the light emitted from points J1, J2, J3, and J4 is identical. The offset in distance from J1 to J4 is used to derive a focus error signal and to drive an appropriate mechanism for correction.

As is evident from the reading system using three light spots described in U.S. Pat. No. 3,876,842, all emitting ends of the waveguides are not necessarily aligned on the same plane. Thus, for tracking, the two emitting ends J2 and J3 for emitting tracking detection light from laser sources 12 and 13 are preferably offset by predetermined amounts relative to each other in a direction perpendicular to the thickness of the substrate.

In this embodiment, at least one substrate (not shown) is provided at the right side of the substrate 10 for supporting the elements 11-14 and 51-56. This substrate is provided with means for optically connecting each of the elements to the corresponding waveguide of the substrate 10.

The laser-waveguide-detector combinations 12, 62, 64, 53, 54 and 13, 66, 68, 55, 56 are used to track grooves and to focus on areas of the surface of the medium so as to allow reading and writing information in the correct areas of a disk.

Not shown in the drawings are the method of moving the device containing the integrated optical elements in response to the tracking error signal received at the tracking detectors and the method of moving the device to focus the light beams onto the magneto-optic media.

Figure 6:
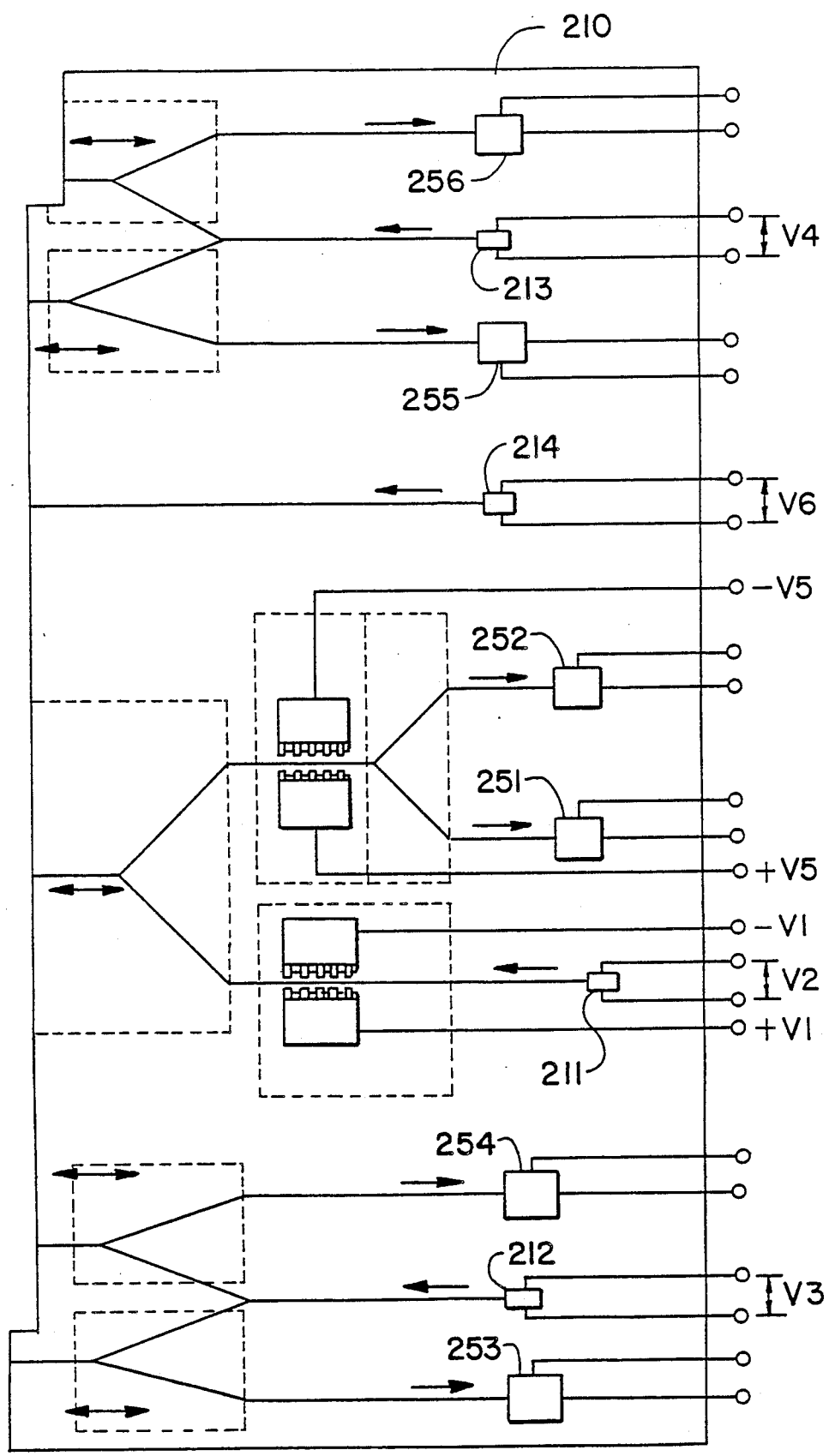
FIG. 6 is a plan view showing the integrated optical head according to another embodiment of this invention.

Another embodiment of the optical device is shown in FIG. 6. Laser sources 211-214 and detectors 251-256 are disposed on a substrate 210.

The laser source 211 is powered via electrodes connected to a current source designated by the voltage V2. The laser sources 212 and 213 are respectively powered by the voltage sources V3 and V4, and the source 214 is powered by voltage source V6. Light from the laser source 211 is to be used for reading information from the medium light from 212 and 213 is used for tracking and focusing, respectively, and light from 214 is for writing information onto the medium.

Each of waveguides and electrodes is fabricated using semiconductor manufacturing technology, and each of the laser sources and detectors is fixed on the substrate at the end portion of the corresponding waveguide. Other construction and operation of this embodiment are similar to the embodiment in FIG. 2.

What is claimed is:

1. An integrated optical device for magneto-optic recording and/or reading, comprising:
    a substrate;
    waveguide means provided on said substrate for transmitting a light energy beam and including one end portion exposed to the outside of said substrate, a first waveguide section lying along a surface of said substrate from said one end portion and a second waveguide section lying along said surface and branched from said first waveguide section;
    means for supplying a polarized light energy beam into said first waveguide section toward said one end portion;
    means for receiving a light energy beam entered from said one end portion and passed through said second waveguide section; and
    means for controlling the light amount arriving at said light receiving means in response to the polarization.

2. An integrated optical device according to claim 1, wherein said light supplying means includes a light source that emits a randomly polarized light.

3. An integrated optical device according to claim 1 further comprising means for controlling polarization of said light energy beam transmitting into said first waveguide section.

4. An integrated optical device according to claim 3, wherein said polarization control means includes electrodes having a periodic structure and being disposed along said first waveguide section.

5. An integrated optical device according to claim 4, wherein the periodicity of said periodic structure is proportional to the wavelength of said light from said light source.

6. An integrated optical device according to claim 1, wherein said control means includes means for rotating polarization of light transmitted into said second waveguide section and means for dividing said light in accordance with polarization rotation angle.

7. An integrated optical device according to claim 6, wherein said dividing means includes polarization selecting waveguides provided in said second waveguide section to divide said light into first and second polarization components.

8. An integrated optical device according to claim 7, wherein said light receiving means includes first and second detectors and said polarization selecting waveguides transmit said first and second polarization components to said first and second detectors, respectively.

9. An integrated optical device according to claim 6, wherein said polarization rotating means includes electrodes having a periodic structure and being disposed along said second waveguide section.

10. An integrated optical device according to claim 9, wherein the periodicity of said periodic structure is proportional to the wavelength of said light form said light source.

11. An integrated optical device for magneto-optic recording and/or reading, comprising:
    a substrate;
    light source means provided on said substrate for emitting a polarized light energy beam;
    light sensing means provided on said substrate;
    waveguide means provided on said substrate and including one end portion exposed to the outside of said substrate, a first waveguide section disposed between said light source means and said one end portion to transmit said polarized light energy beam to said one end portion and a second waveguide section branched from said first waveguide section to transmit light entered into said first waveguide means from said one end portion to said light sensing means; and means for controlling the light amount arriving at said light sensing means in response to the polarization.

12. An integrated optical device according to claim 11, wherein said light source means includes a light source emitting randomly polarized light.

13. An integrated optical device according to claim 12, wherein said light source means further includes means for controlling polarization of said randomly polarized light from said light source.

14. An integrated optical device according to claim 13, wherein said polarization control means includes electrodes having a periodic structure and being disposed along said first waveguide section.

15. An integrated optical device according to claim 14, wherein the periodicity of said periodic structure is proportional to the wavelength of said light from said light source.

16. An integrated optical device according to claim 11, wherein said control means detects the amount of polarization rotation of light.

17. An integrated optical device according to claim 11, wherein said control means includes means for rotating polarization of light transmitted into said second waveguide section and means for dividing said light in accordance with polarization rotation angle.

18. An integrated optical device according to claim 17, wherein said dividing means includes polarization selecting waveguides provided in said second waveguide section to divide said light into first and second polarization components.

19. An integrated optical device according to claim 18, wherein said light sensing means includes first and second detectors and said polarization selecting waveguides transmit said first and second polarization components to said first and second detectors, respectively.

20. An integrated optical device according to claim 17, wherein said polarization rotating means includes electrodes having a periodic structure and being disposed along said second waveguide section.

21. An integrated optical device according to claim 20, wherein the periodicity of said periodic structure is proportional to the wavelength of said light from said light source.

22. An integrated optical device according to claim 11 further comprising another light source means provided on said substrate for emitting another light energy beam, another light sensing means provided on said substrate and another waveguide means provided on said substrate, said another waveguide means including one end portion exposed to the outside of said substrate, a first waveguide section disposed between said another light source means and said one end portion to transmit said light energy beam to said another one end portion and a second waveguide section branched from said first waveguide section to transmit light entered into said first waveguide means from said one end portion to said another light sensing means.

23. An integrated optical device according to claim 1, further comprising:

a pair of waveguide means provided on said substrate for transmitting light energy beams, each waveguide means including one end portion exposed to the outside of said substrate, a first waveguide section lying along a surface of said substrate from said one end portion and a second waveguide section lying along said surface and branched from said first waveguide section;

means for supplying a light energy beam into each of the last-mentioned first waveguide sections toward the respective one end portions; and means for receiving light beams entered from each of the last-mentioned one end portions and passed through the respective second waveguide sections.

24. An integrated optical device according to claim 23, wherein said one end portions of said pair of waveguide means are spaced from each other along a direction in which light energy beams enter into the respective one end portions.

25. An integrated optical device according to claim 23, wherein said one end portions of said pair of waveguide means are spaced from each other in a direction along the thickness of said substrate.

26. An integrated optical device according to claim 11, further comprising:

a pair of waveguide means provided on said substrate for transmitting light energy beams, each waveguide means including one end portion exposed to the outside of said substrate, a first waveguide section lying along a surface of said substrate from said one end portion and a second waveguide section lying along said surface and branched from said first waveguide section;

means for supplying a light energy beam into each of the last-mentioned first waveguide sections toward the respective one end portions; and means for receiving light beams entered from each of the last-mentioned one end portions and passed through the respective second waveguide sections.

27. An integrated optical device according to claim 11, wherein said one end portions of said pair of waveguide means are spaced from each other along a direction in which light energy beams enter into the respective one end portions.

28. An integrated optical device according to claim 11, wherein said one end portions of said pair of waveguide means are spaced from each other in a direction along the thickness of said substrate.

29. An integrated optical device according to claim 11, wherein said light control means is provided on said substrate.

30. An integrated optical device for magneto-optical recording and/or reading, comprising:

a substrate;

waveguide means provided on said substrate for transmitting a light energy beam and including one end portion exposed to the outside of said substrate, a first waveguide section lying along a surface of said substrate from said one end portion and a second waveguide section lying along said surface and branched from said first waveguide section;

means for supplying a polarized light energy beam into said first waveguide section toward said one end portion;

means for receiving a light energy beam entered from said one end portion and passed through said second waveguide section; and means for controlling the light amount arriving at said light receiving means in response to the polarization, said light control means being provided on said substrate.

31. An integrated optical device according to claim 30, wherein said light control means includes means for rotating polarization of light transmitted into said second waveguide section and means for dividing said light in accordance with polarization rotation angle.

32. An integrated optical device according to claim 31, wherein said polarization rotating means includes electrodes having a periodic structure and being disposed along said second waveguide section.

33. An integrated optical device for magneto-optical recording and/or reading, comprising:
a substrate;
a pair of waveguide means provided on said substrate for transmitting light energy beams, each waveguide means including one end portion exposed to the outside of said substrate, a first waveguide section lying along a surface of said substrate from said one end portion and a second waveguide section lying along said surface and branched from said first waveguide section;
means for supplying a light energy beam into each first waveguide section toward the respective one end portion; and
means for receiving a light energy beam entered from each one end portion and passed through the respective second waveguide section;
wherein said one end portions of said pair of waveguide means are spaced from each other in the direction of entering of said beams at said one end portions.

34. An integrated optical device for magneto-optical recording and/or reading, comprising:
a substrate;
a pair of waveguide means provided on said substrate for transmitting light energy beams, each waveguide means including one end portion exposed to the outside of said substrate, a first waveguide section lying along a surface of said substrate from said one end portion and a second waveguide section lying along said surface and branched from said first waveguide section;
means for supplying a light energy beam into each first waveguide section toward the respective one end portion; and
means for receiving a light energy beam entered from each one end portion and passed through the respective second waveguide section;
wherein said one end portions of said pair of waveguide means are spaced from each other in the direction of the thickness of said substrate.

* * * * *